United States Patent [19]

Wieber et al.

[11] 4,283,111
[45] Aug. 11, 1981

[54] MICROSCOPE STAND WITH PROTECTED TURRET

[75] Inventors: Karl Wieber, Asslar-Berghausen; Heinrich Janke, Braunfels; Winfried Kraft, Asslar-Werdorf; Robert Lisfeld, Greifenstein-Ulm, all of Fed. Rep. of Germany

[73] Assignee: Ernst Leitz Wetzlar GmbH, Wetzlar, Fed. Rep. of Germany

[21] Appl. No.: 115,723

[22] Filed: Jan. 28, 1980

[30] Foreign Application Priority Data

Jan. 26, 1979 [DE] Fed. Rep. of Germany ....... 2902962

[51] Int. Cl.³ ............................................. G02B 21/24
[52] U.S. Cl. ......................................... 350/39; 350/82
[58] Field of Search ..................... 350/82, 80, 69, 39, 350/38, 37, 8

[56] References Cited

U.S. PATENT DOCUMENTS 3,565,512  2/1971  Peck ....................................... 350/82
4,168,881  9/1979  Rosenberger ......................... 350/82

Primary Examiner—Jon W. Henry
Attorney, Agent, or Firm—Schwartz, Jeffery, Schwaab, Mack, Blumenthal & Koch

[57] ABSTRACT

Disclosed is a microscope stand which permits a lens turret and an eyepiece mounted on the stand to be mounted close enough together to eliminate the necessity of an intervening tube lens. In permitting this mounting of the lenses, a recess is provided in the stand which substantially weakens the mounting structure. Vertical webs are provided in the preferred embodiment which extend adjacent the recess and external to the lens turret which strengthen the microscope stand and mounting structure.

7 Claims, 2 Drawing Figures

U.S. Patent  Aug. 11, 1981  4,283,111
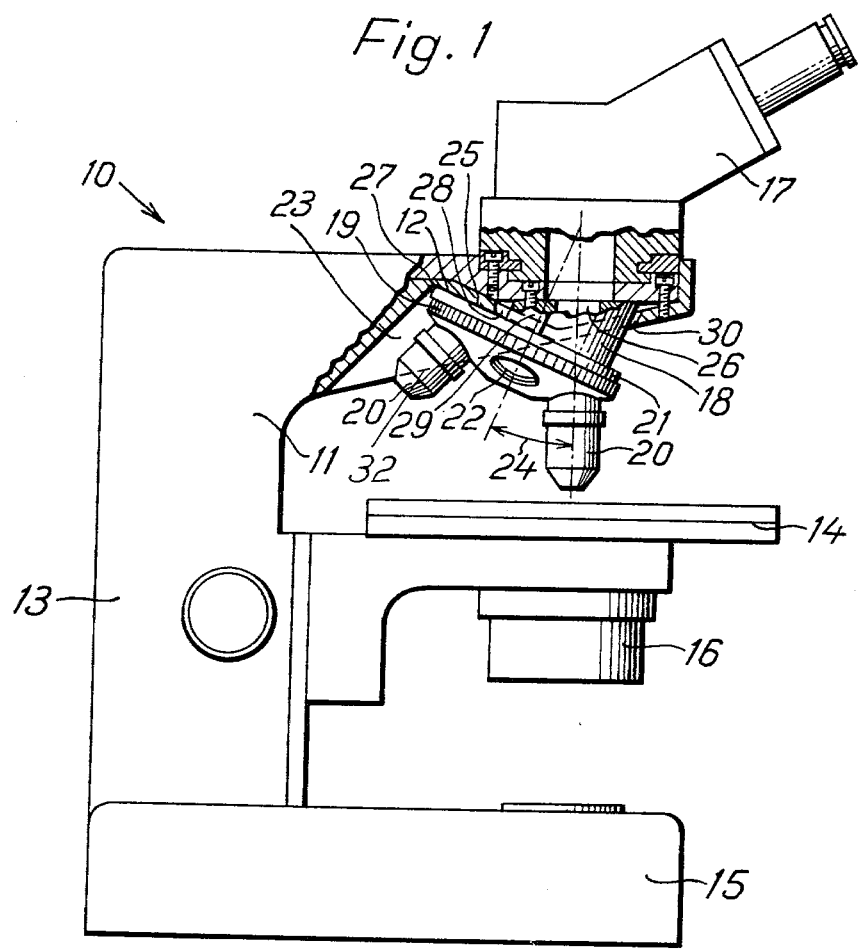
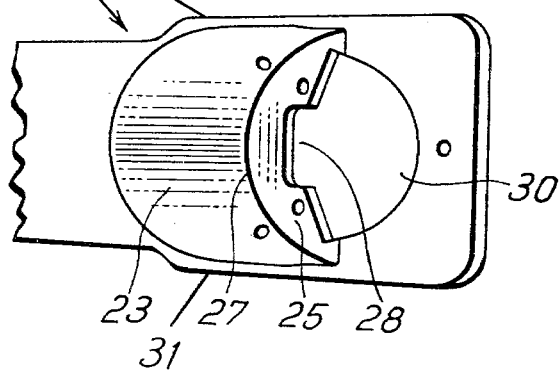

MICROSCOPE STAND WITH PROTECTED TURRET

BACKGROUND OF THE INVENTION

The present invention generally relates to microscopes, and specifically relates to microscope stands which have a lens turret rotatingly mounted thereon such that the objective lens which is furthest from the microscope stand is in its vertical working position.

In prior art microscopes of this type, the lens turret has a number of objective lenses mounted on the turret at an angle with respect to the axis of rotation of the turret. Therefore, the axis of rotation of the turret is always displaced with respect to the vertical which is the working position of the objective lens being used. In the type of microscope in which the working objective lens is the furthest from the lens stand, the stand protects the unused lenses from inadvertent damage. In order to accommodate the axis of rotation of the lens turret, the turret is mounted on a planar surface which in cross section increases in thickness towards its front surface.

With the increasing thickness towards its front surface necessary to provide the proper mounting angle for the lens turret, there is always a portion of the microscope stand which has a relatively small thickness and is generally an angular discontinuity at the lower edge of the stand. The combination of the angular discontinuity and the very thin thickness at this point contribute to a substantial reduction in the rigidity of the lens holder. To compensate for this weaker stand, the minimum thickness of the stand at this weaker point must be substantially increased with the result that the lens turret is located at a substantially further distance from the eyepiece. Because of this increased distance between the objective lens (on the lens turret) and the eyepiece, an additional lens (called a tube lens) must be inserted into the beam path.

The utilization of a tube lens adversely affects both the light flux and the techniques for optical correction in a precision microscope. Furthermore, the use of such a tube lens involves higher costs both for the lens and its mounting structure and its installation. This is especially true when the microscope is equipped with a plurality of objective lenses and eyepieces which are designed for use in a simple microscope (one without a tube lens).

SUMMARY OF THE INVENTION

It is therefore an object of the present invention to provide a microscope which is equipped with a lens turret and an eyepiece which does not require a tube lens and has a microscope stand of sufficient rigidity.

The above and other objects are achieved by providing a microscope having an eyepiece assembly and a rotatable lens turret mounted thereon. These elements are mounted on a microscope stand having a recess in which the lens turret is mounted. However, to compensate for the weakening of the microscope stand due to the recess, vertical webs are included as part of the microscope stand along the outer portion of the recess where they do not interfere with the movement of the rotatable lens turret. These webs have a much thicker vertical section than does the microscope stand in the recess itself and thus provide the required rigidity while at the same time permitting the rotatable lens turret to be mounted relatively close to the eyepiece assembly in order to obviate the necessity of an intervening tube lens.

BRIEF DESCRIPTION OF THE DRAWINGS

A more complete appreciation of the invention and the attendant advantages thereof will be more clearly understood by reference to the following drawings, wherein:

FIG. 1 is a side view partially in section showing the details of the present invention; and FIG. 2 is a bottom view of the recess according to the present invention.

DETAILED DESCRIPTION OF PREFERRED EMBODIMENTS

Referring now to the drawings wherein like reference characters designate like parts throughout the several views, the microscope 10 shown in FIG. 1 comprises generally a stand 11, which is rectangular in the present case, a holder 12, here horizontal, and a vertical member 13 to which an object stage 14 is fastened in a vertically displaceable manner. A foot 15 of the stand includes an optical illuminating device, not shown in detail and provides stable support for the vertical member 13. An eyepiece tube 17 is mounted on the upper surface of the holder 12 with a condenser 16 arranged under the object stage 14. A lens turret 19 for carrying several objectives 20 is rotatingly mounted on the lower front part of the holder 12 by means of a connecting fitting 18. The connecting fitting 18 has the shape of a cylindrical segment bevelled at the top and has an annular shoulder 21 at its lower end whereupon the lens turret 19 is mounted. In the latter, threads 22 are provided to accommodate the objectives 20. The holder 12 has a recess 23 open in the downward direction and domed in the direction of the vertical member 13, said recess having the shape of a cone segment and receiving a part of the connecting fitting 18 and of the lens turret 19. The connecting fitting 18 with the lens turret 19 mounted thereon is inclined backward, i.e. in the direction away from the user of the microscope, whereby the axis of rotation of the lens turret 19 includes an angle 24 with the optical axis and the objective 20, furthest away from the upright member 13, is vertical in its working position.

The recess 23 has a planar recessed surface 25, which is perpendicular to the axis of rotation of the lens turret 19 and may serve as the supporting surface for the mounting of the lens turret 19. In the present case, however, the lens turret, for reasons of manufacturing technology, is mounted on the shoulder 21 of the connecting fitting 18, for example by means of screwing. The connecting fitting 18 is provided in its frontal area with a cylindrical orifice 26 for the optical beam. The recessed surface 25 is parallel to the annular shoulder 21 of the fitting 18 and extends with its limiting edge 27 close to the upper surface of the holder 12. This layout, together with the cone segment shaped recess 23, provides space for the objectives 20 which are not in their operating position.

In the area of the recess 23, the holder 12 is broadened in the lateral direction to include vertical webs 31 as shown in FIG. 2. At the limiting edge 27, the recess 23 passes into the recessed surface 25 which is equipped with a U-shaped depression 28, wherein a projection 29 of the fitting 18 partially engages. In the holder 12, an approximately semicircular orifice 30 originating at the recessed surface 25 and located above the orifice 26, is provided. The lower edges of the vertical webs 31 on the sides of holder 12, from the holder's front portion to the rear, form a generally straight line as shown in phantom as line 32 on FIG. 1.

Advantageously, the recess is in the shape of a conical segment. For reasons of manufacturing technology, however, it may be convenient to design the recess in the shape of a cylinder or a segment of a cylinder. It is merely necessary to provide space in the recess for the objective not in the working position. The lens turret, in accordance with one embodiment of the invention, may be mounted directly on the recessed surface of the recess or in accordance with another embodiment of the invention a connecting fitting may be interposed and the lens turret attached thereto. To obtain a sufficient rigidity of the holder, it is only necessary to widen the holder within the area of the recess. In a preferred embodiment, the lower edges of the vertical webs of the holder in a lateral projection are straight lines to the front of the holder and there is no angular interruption of said edges.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

1. A microscope including an eyepiece assembly, a rotatable lens turret, at least one objective lens mounted on said lens turret, said microscope further including a microscope stand, said stand having front and rear portions including an eyepiece and lens turret mounting structure, said structure extending generally horizontally in a direction from the rear portion of said stand towards the front portion of said stand, said stand including means defining a recess in a lower surface of said structure, said recess extending towards an upper surface of said structure, said recess defining a recessed surface, said eyepiece assembly mounted on said upper surface and said lens turret rotatably mounted on said recessed surface, said recessed surface recessed from a lower surface of said structure and at an angle with the horizontal, said recessed surface slopes downwardly away from said rear portion of said stand, said recessed surface being sufficiently close to said upper surface such that said lens turret and said eyepiece assembly are operatively mounted to obviate the necessity of an intervening tube lens, said recess contributing to define a weakened portion of said structure, said structure further including means for strengthening said weakened portion, said strengthening means comprises at least one vertical web along said structure, said web having a greater vertical thickness adjacent said recess than the vertical thickness of said structure in said recess.

2. A microscope according to claim 1, wherein said recess is at least partially defined by a segment of a conical surface.

3. A microscope according to claim 1, wherein said recess is at least partially defined by at least a segment of a cylindrical surface.

4. A microscope according to one of claims 1, 2 or 3, wherein said lens turret includes means for mounting said turret on said recessed surface.

5. A microscope according to one of claims 1, 2 or 3, wherein there is further provided a connecting fitting mounted on said recessed surface and said lens turret includes means for mounting said lens turret on said connecting fitting.

6. A microscope according to one of claims 1, 2 or 3, wherein said structure is wider in the lateral direction in the area of said recessed surface.

7. A microscope according to one of claims 1, 2 or 3, wherein said at least one vertical web has a lower edge and said lower edge extends in a straight line from the rear portion of the stand to the front portion of the stand.

* * * * *